US009650014B2

(12) United States Patent
Suemune et al.

(10) Patent No.: US 9,650,014 B2
(45) Date of Patent: May 16, 2017

(54) EXTERNAL AIRBAG

(71) Applicant: Fuji Jukogyo Kabushiki Kaisha, Tokyo (JP)

(72) Inventors: Hiroshi Suemune, Tokyo (JP); Yoshiyuki Hashimoto, Tokyo (JP); Akihiro Onodera, Tokyo (JP); Hiroshi Yoneyama, Tokyo (JP); Daisuke Ototsuji, Tokyo (JP); Isamu Nagasawa, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/052,735

(22) Filed: Feb. 24, 2016

(65) Prior Publication Data

US 2016/0264093 A1  Sep. 15, 2016

(30) Foreign Application Priority Data

Mar. 9, 2015 (JP) .................................. 2015-046277

(51) Int. Cl.
| | |
|---|---|
| *B60K 28/10* | (2006.01) |
| *B60R 21/36* | (2011.01) |
| *B60R 21/2338* | (2011.01) |
| *B60R 21/34* | (2011.01) |
| *B60R 21/00* | (2006.01) |

(52) U.S. Cl.
CPC .......... *B60R 21/36* (2013.01); *B60R 21/2338* (2013.01); *B60R 2021/003* (2013.01); *B60R 2021/0004* (2013.01); *B60R 2021/23386* (2013.01); *B60R 2021/346* (2013.01)

(58) Field of Classification Search
CPC ................ B60R 21/2338; B60R 21/36; B60R 2021/23386
USPC ............................ 280/743.1, 743.2; 180/278
See application file for complete search history.

(56) References Cited

U.S. PATENT DOCUMENTS

| | | | | |
|---|---|---|---|---|
| 6,467,563 | B1* | 10/2002 | Ryan ....................... | B60R 21/36 180/274 |
| 2003/0178239 | A1* | 9/2003 | Takimoto ............ | B60R 21/2338 180/274 |
| 2004/0232663 | A1* | 11/2004 | Takimoto ............ | B60R 21/2338 280/730.1 |
| 2006/0151228 | A1* | 7/2006 | Kalliske .............. | B60R 21/2338 180/274 |

(Continued)

FOREIGN PATENT DOCUMENTS

| | | |
|---|---|---|
| JP | 2003-252143 A | 9/2003 |
| JP | 2006-044569 A | 2/2006 |

(Continued)

OTHER PUBLICATIONS

Japanese Office Action dated Jun. 7, 2016 with an English translation thereof.

*Primary Examiner* — Toan To
(74) *Attorney, Agent, or Firm* — McGinn IP Law Group, PLLC.

(57) ABSTRACT

An external airbag includes: lateral edge bags in a pair that are deployed to extend upward along respective front pillars from lower ends of the respective front pillars, in front of the respective front pillars, the respective front pillars being disposed on both widthwise sides of a windshield of an automobile; and a posture holding member that couples upper ends of the lateral edge bags in the pair to each other.

13 Claims, 7 Drawing Sheets

(56) References Cited

U.S. PATENT DOCUMENTS

| | | | |
|---|---|---|---|
| 2006/0201731 A1* | 9/2006 | Nakamura | B60R 21/36 180/274 |
| 2007/0114090 A1* | 5/2007 | Okamoto | B60R 21/36 180/274 |
| 2014/0027195 A1* | 1/2014 | Kalliske | B60R 21/36 180/271 |
| 2014/0291054 A1* | 10/2014 | Tanaka | B60R 21/36 180/274 |
| 2014/0318881 A1* | 10/2014 | Sugimoto | B60R 21/237 180/274 |
| 2016/0023629 A1* | 1/2016 | Park | B60R 21/36 180/274 |

FOREIGN PATENT DOCUMENTS

| | | |
|---|---|---|
| JP | 2011-213142 A | 10/2011 |
| JP | 2015-104950 A | 6/2015 |

* cited by examiner

EXTERNAL AIRBAG

CROSS-REFERENCE TO RELATED APPLICATIONS

The present application claims priority from Japanese Patent Application No. 2015-046277 filed on Mar. 9, 2015, the entire contents of which are hereby incorporated by reference.

BACKGROUND

1. Technical Field

The present disclosure relates to an external airbag and particularly to an external airbag that is deployed so as to extend upward along the front pillars.

2. Related Art

In related art, external airbags have been used that protect a subject to be protected such as a pedestrian against the impact of a collision in case the subject to be protected collides with an automobile. In general, an external airbag is folded and housed in an automobile and is deployed by injection of deployment gas into the airbag. The deployed external airbag, when receiving a subject to be protected, is deformed depending on the pressure from the subject, and thus the collision energy of the subject is absorbable by the external airbag. External airbags are in practical use which are each deployed along, for instance, front pillars which are formed solidly in an automobile. Because a subject to be protected may collide with the front pillars in various directions and speeds, an external airbag adapted to the collision is called for.

Thus, as a technique for protecting a subject to be protected involved in a collision with a high speed, for instance, Japanese Unexamined Patent Application Publication (JP-A) No. 2011-213142 proposes an airbag device in which a door portion formed in a cover member has a front door portion and an inner door portion, the front door portion being disposed forwardly of a mirror body to be opened so that the inner edge side faces the outside, the inner door portion being disposed inwardly of the mirror body to be opened so that the front edge side faces the rear side. In the airbag device, at the time of deployment of the airbag, the bag body is made to project quickly through an opening for projection, which is formed by opening the front door portion and the inner door portion, and thus the subject to be protected may be protected by deploying the airbag before the subject collides with a front pillar.

SUMMARY OF THE INVENTION

Here, the posture of an airbag at the time of deployment and after the deployment becomes unstable because the airbag is deployed so as to extend along the front pillars. The airbag device of JP-A No. 2011-213142 is provided with an inflation support portion or the like to stabilize the posture of the airbag after deployment. However, this complicates the structure of the airbag device and may interfere with the deployment.

It is desirable to provide an external airbag capable of easily stabilizing the posture of the airbag at the time of deployment and after the deployment.

An aspect of the present disclosure provides an external airbag that includes: lateral edge bags in a pair that are deployed to extend upward along respective front pillars from lower ends of the respective front pillars, in front of the respective front pillars disposed on both widthwise sides of a windshield of an automobile; and a posture holding member that couples upper ends of the lateral edge bags in the pair to each other.

The lateral edge bags in the pair may be deployed to cover the respective front pillars from lower ends to upper ends.

The posture holding member may be disposed to hide a front edge of a roof panel from a front side, the front edge being provided along an upper edge of the windshield.

The external airbag may further include a linear member that extends between the lateral edge bags in the pair.

The linear member may be disposed in a net pattern between the lateral edge bags in the pair.

The external airbag may further include a lower edge bag that is deployed along a cowl panel that is disposed at a lower edge portion of the windshield.

BRIEF DESCRIPTION OF THE DRAWINGS

FIG. 1A is a front view and FIG. 1B is a side view of the external airbag;

FIG. 8A is a perspective view and FIG. 8B is a sectional view of the external airbag, taken along line VIIIB-VIIIB of FIG. 8A;

DETAILED DESCRIPTION

Hereinafter, the implementations of the present disclosure will be described with reference to the accompanying drawings.

<A First Implementation>

Figure 1A:
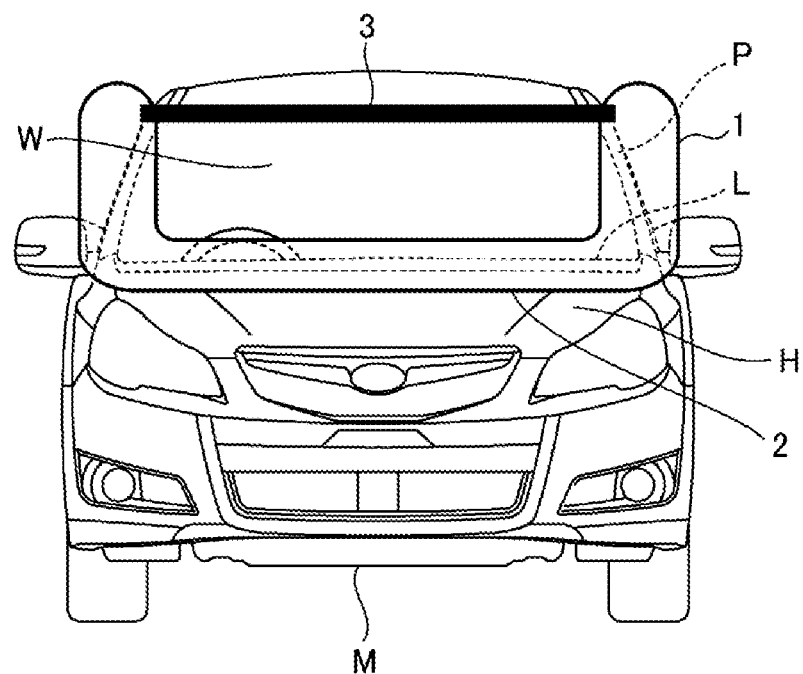
FIGS. 1A and 1B illustrate the configuration of an external airbag according to a first implementation of the present disclosure.
Figure 1B:
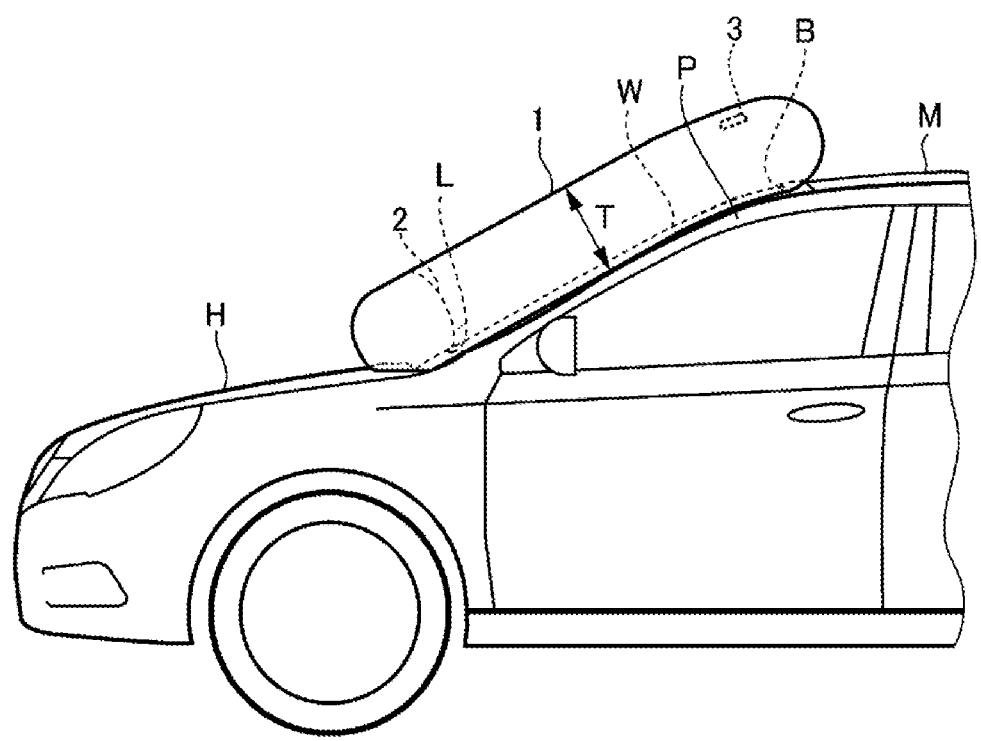

FIGS. 1A and 1B illustrate the configuration of an external airbag according to a first implementation of the present disclosure. The external airbag includes lateral edge bags 1 in a pair that are deployed so as to extend upward along front pillars P in a pair from the lower end side of the front pillars P, in front of the front pillars P disposed on both widthwise sides of a windshield W of an automobile M, a lower edge bag 2 that is deployed so as to extend along a cowl panel L disposed at the lower edge side of the windshield W, and a posture holding member 3 that couples the upper end portions of the lateral edge bags 1.

It is to be noted that in the automobile M, the windshield W is provided rearwardly from the lower edge to the upper edge in an inclined manner, front pillars P in a pair are provided along both lateral edges of the windshield W in an inclined manner, and a roof panel is disposed rearwardly from the upper edge of the windshield W. In addition, cowl panel L is disposed along the lower edge of the windshield W and the front edge B (a portion corresponding to the front brace) of the roof panel is positioned along the upper edge of the windshield W, and front hood H is provided so as to project forward from a vicinity of the lower edge of the windshield W and to cover the front of the automobile M.

The lateral edge bags 1 are deployed so as to cover the front pillars P from the lower ends to the upper ends. The lower edge bag 2 is deployed so as to cover the cowl panel L from the front side, and both ends of the lower edge bag 2 are coupled to the lower ends of the lateral edge bags 1. Also, the lower portion of the lower edge bag 2 is fixed to the automobile M. The lateral edge bags 1 and the lower edge bag 2 are formed so as to project forward from the windshield W with a certain thickness T. In addition, the lateral edge bags 1 and the lower edge bag 2 have a continuous circular cross section, and the insides thereof, which are hollowly formed, are coupled so as to communicate with each other.

The posture holding member 3 supports the lateral edge bags 1 to hold their posture. The posture holding member 3 has an elongated shape and one end thereof is coupled to one upper end portion of the lateral edge bags 1 and the other end is coupled to the other upper end portion of the lateral edge bags 1. In addition, the posture holding member 3 is formed to be long widthwise in a direction along the windshield W and is disposed to substantially face a front edge portion B of the roof panel so as to hide the front edge portion B of the roof panel from the front side. The posture holding member 3 may be composed of, for instance, a tether, the ground fabric of the external airbag, or a thin airbag.

Figure 2:
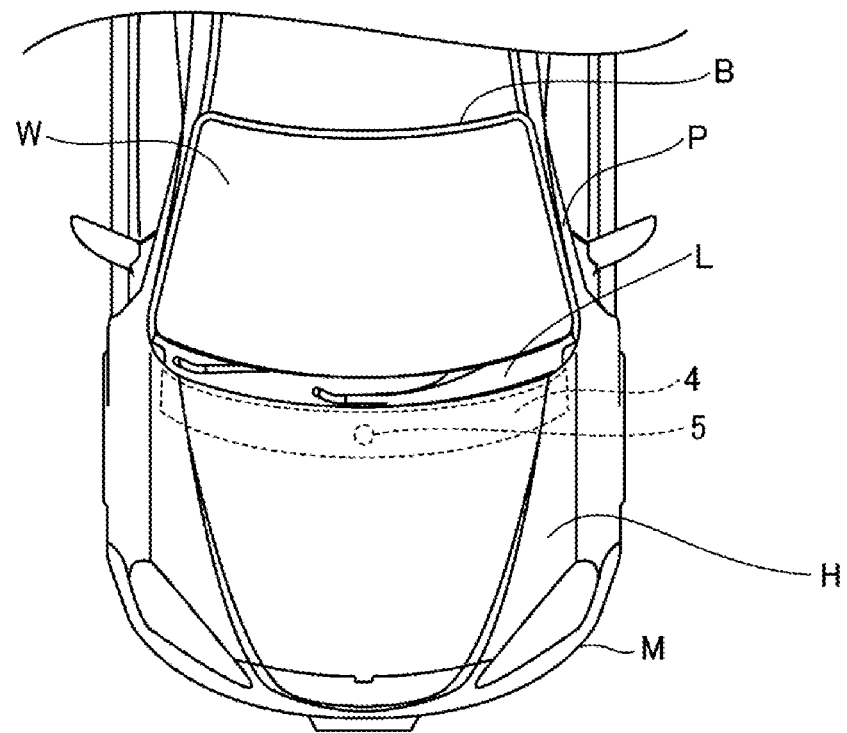
FIG. 2 is a view illustrating the external airbag housed in an automobile.

FIG. 2 illustrates an external airbag housed in the automobile M. The external airbag is housed in a folded state in a housing unit 4 disposed below the rear edge of the front hood H that covers the front of the automobile M. The posture holding member 3 is thinly formed and may be housed in a more compact space compared with the lateral edge bags 1 and the lower edge bag 2. In addition, the housing unit 4 is provided with an inflator 5 which is coupled to the lower edge bag 2. Deployment gas is injected into the external airbag from the inflator 5 through the lower edge bag 2, and the external airbag is thereby deployed externally of the vehicle through the space between the rear edge of the front hood H and the lower edge of the windshield W.

Figure 3:
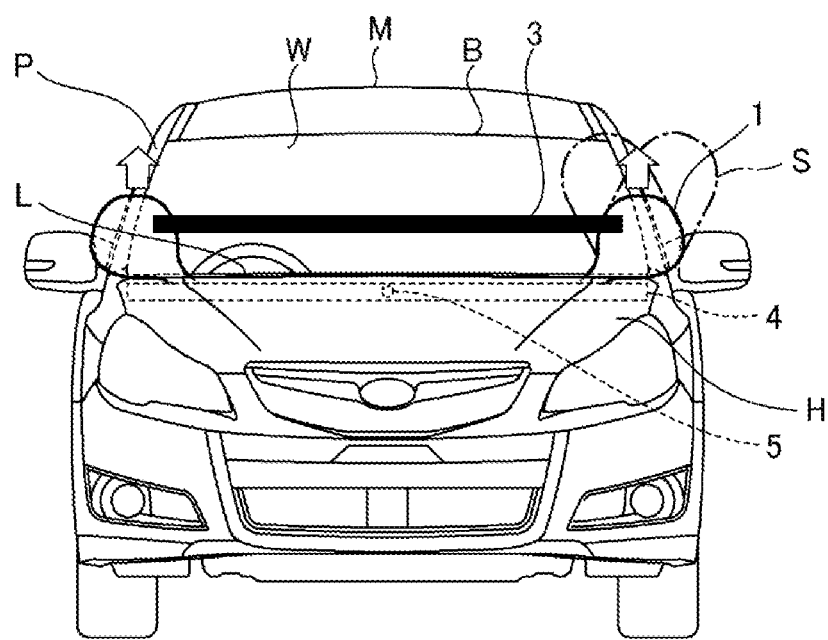
FIG. 3 is a view illustrating the manner in which the external airbag is deployed.

At this point, as illustrated in FIG. 3, the posture holding member 3 along with the upper ends of the lateral edge bags 1 is first exposed to the outside of the vehicle, and the lateral edge bags 1 are deployed so as to extend upward along the front pillars P. Here, the lateral edge bags 1 is fixed to the automobile M at the lower ends via the lower edge bag 2, and the portion of each lateral edge bag 1, which extends between the lower end and the upper end of a corresponding front pillar P, is not fixed to the automobile M. For this reason, if the lateral edge bags 1 are deployed without being supported, the posture thereof is not stable, and the lateral edge bags 1 may be deployed while being moved to the lateral side like lateral edge bag S, for instance. Thus, support of the lateral edge bags 1 each other by coupling the lateral edge bags 1 with the posture holding member 3 allows the posture of the lateral edge bags 1 at the time of deployment to be stable, and the front pillars P may be quickly covered by the lateral edge bags 1.

In addition, while the lateral edge bags 1 are deployed along the front pillars P, the lower edge bag 2 is also exposed to the outside of the vehicle and is deployed along the cowl panel L. In this manner, as illustrated in FIGS. 1A and 1B, the lateral edge and lower edge bags 1 and 2 are deployed so that the lateral edge bags 1 cover the front pillars P and the lower edge bag 2 covers the cowl panel L. Even after the deployment, the lateral edge bags 1 are supported each other by the posture holding member 3, and thus it is possible to stabilize the posture of the lateral edge bags 1.

It is to be noted that the direction of deployment of the external airbag is controllable, for instance, by the direction of deployment gas injected from the inflator 5, the shape of the external airbag, and the manner in which the external airbag is folded. Also, the order of deploying the external airbag is controllable by the manner of folding, and for instance, by folding the external airbag so that the upper ends of the lateral edge bags 1 and the posture holding member 3 are disposed outwardly, the external airbag may be deployed as described above.

Next, an example will be described in which the external airbag is deployed to protect a subject to be protected. First, when a subject to be protected such as a pedestrian or a bicycle rider approaches the front of the automobile M, a detection sensor (not illustrated) mounted on the automobile M detects the subject to be protected. As a detection sensor, it is possible to utilize, for instance, a sensor that detects a subject to be protected by emitting laser to the subject, and a sensor that detects a subject based on an image obtained from a camera. When it is determined that the subject to be protected collides with the automobile M based on detection information obtained from the detection sensor, as illustrated in FIG. 2, deployment gas is injected from the inflator 5 into the external airbag housed in the housing unit 4.

When the deployment gas is injected into the external airbag, as illustrated in FIG. 3, the upper ends of the lateral edge bags 1 and the posture holding member 3 are first exposed from the inside of the housing unit 4 to the outside of the vehicle. Subsequently, the lateral edge bags 1 are deployed so as to extend upward along the front pillars P from the lower end, and the posture holding member 3 is moved upward along the windshield W as the lateral edge bags 1 are deployed. At this point, the upper ends of the lateral edge bags 1 are mutually coupled and supported by the posture holding member 3, and thus the lateral edge bags 1 at the time of deployment has a stable posture and may be deployed smoothly. In particular, the lateral edge bags 1 are formed large so as to cover each front pillar P from the lower end to the upper end and to forwardly project significantly. For this reason, although the posture of the lateral edge bags 1 may be significantly distorted at the time of deployment, the provided posture holding member 3 allows the posture of the lateral edge bags 1 to be reliably stabilized.

When the lateral edge bags 1 are deployed so as to cover the front pillars P from the lower end to the upper end, the posture holding member 3 is positioned to hide the front edge portion B of the roof panel from the front side. In addition, while the lateral edge bags 1 are deployed, the lower edge bag 2 is deployed so as to cover the cowl panel L. In this manner, the lateral edge bags 1 and the lower edge bag 2 are deployed along the front pillars P and the cowl panel L, and thus the view of a driver of the automobile M is not obstructed but the view of the driver at the time of deployment is secured. Since the deployed external airbag has a shape surrounding the windshield W, the view of the driver is secured even after the deployment.

Figure 4:
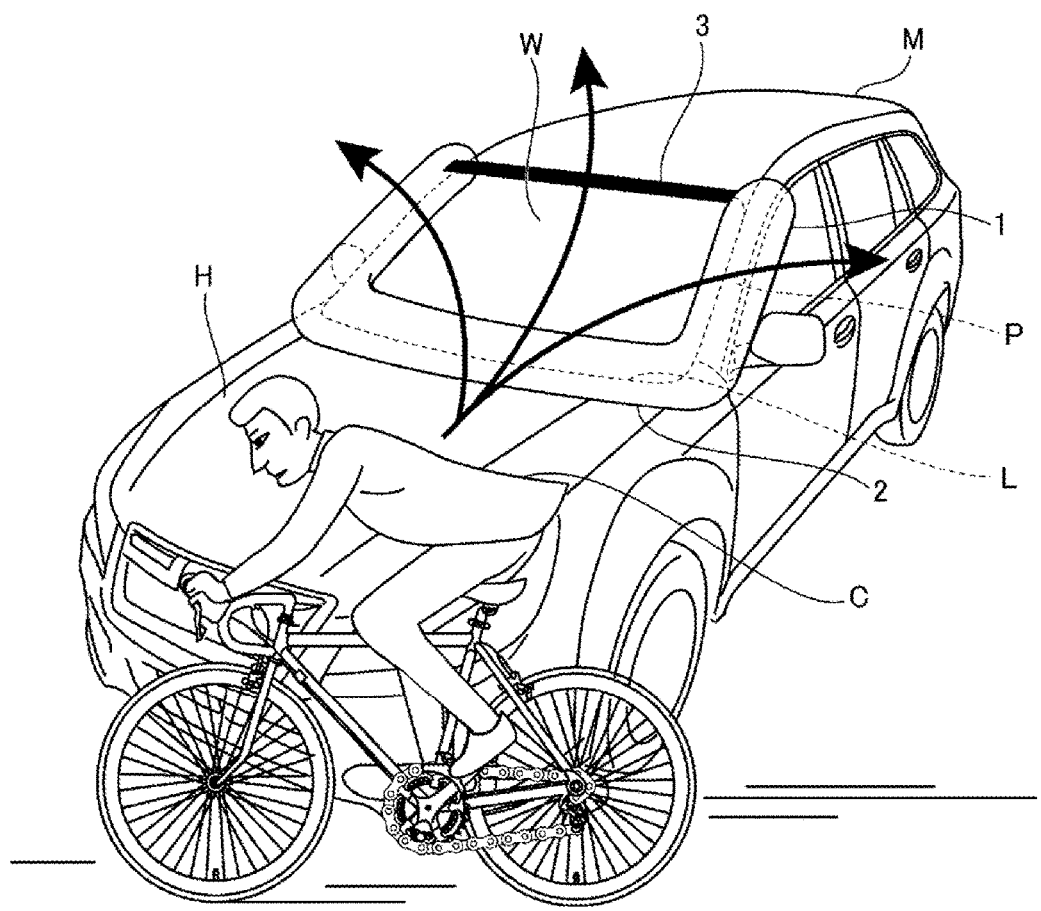
FIG. 4 is a view illustrating the manner in which a subject to be protected riding a bicycle collides with an automobile.

In this manner, as illustrated in FIGS. 1A and 1B, the external airbag is deployed so as to surround the edge of the windshield W. Here, a subject to be protected who has collided with the automobile M may be thrown into a wide range. Particularly when the automobile M collides with a subject to be protected C riding on a bicycle as illustrated in FIG. 4, the subject to be protected C may be thrown into a wide range rearwardly because the subject has a high centroid position. For instance, the subject to be protected C thrown upward over the automobile M may collide with the front edge B of the roof panel then may be further thrown far rearwardly of the roof panel. Also, the subject to be protected C thrown laterally of the automobile M may collide with the side of a front pillar P then may be thrown further laterally, and may have a secondary collision with an oncoming vehicle.

Figure 5A:
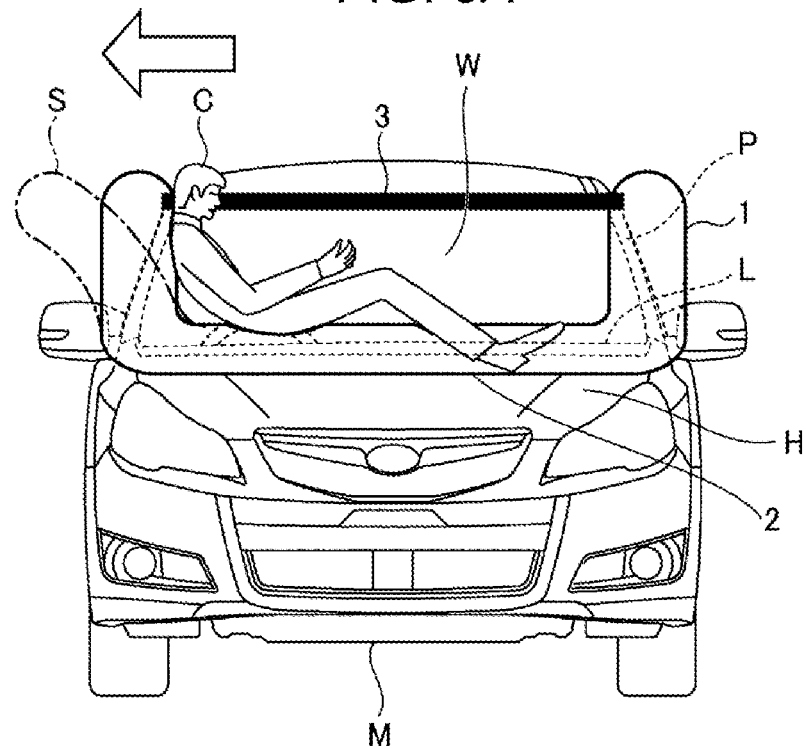
FIGS. 5A and 5B are views illustrating the manner in which the subject to be protected is received.

Thus, by deploying the external airbag as described above, it is possible to receive the subject to be protected C thrown into a wide range. For instance, as illustrated in FIG. 5A, the subject to be protected C thrown toward a front pillar P is received by the inner wall of a lateral edge bag 1 having a large thickness T and collision energy of the subject to be protected C is absorbed by deformation of the lateral edge bag 1. At this point, if the lateral edge bags 1 are not mutually coupled by the posture holding member 3, the upper end of a lateral edge bag 1 may be significantly deformed laterally like lateral edge bag S by the pressure from the laterally moving subject to be protected C and the subject to be protected C may be thrown in a lateral direction of the front pillar P. Thus, when the subject to be protected C is received by the inner wall of at least either one of the lateral edge bags 1, support of the lateral edge bags 1 each other by mutually coupling their upper ends with the posture holding member 3 may reduce the risk of the subject C being thrown to the outside of the lateral edge bags 1. Since the lateral edge bags 1 are disposed so as to cover the front pillars P, direct collision of the subject to be protected C with a front pillar P may be protected when the subject C is received.

Figure 5B:
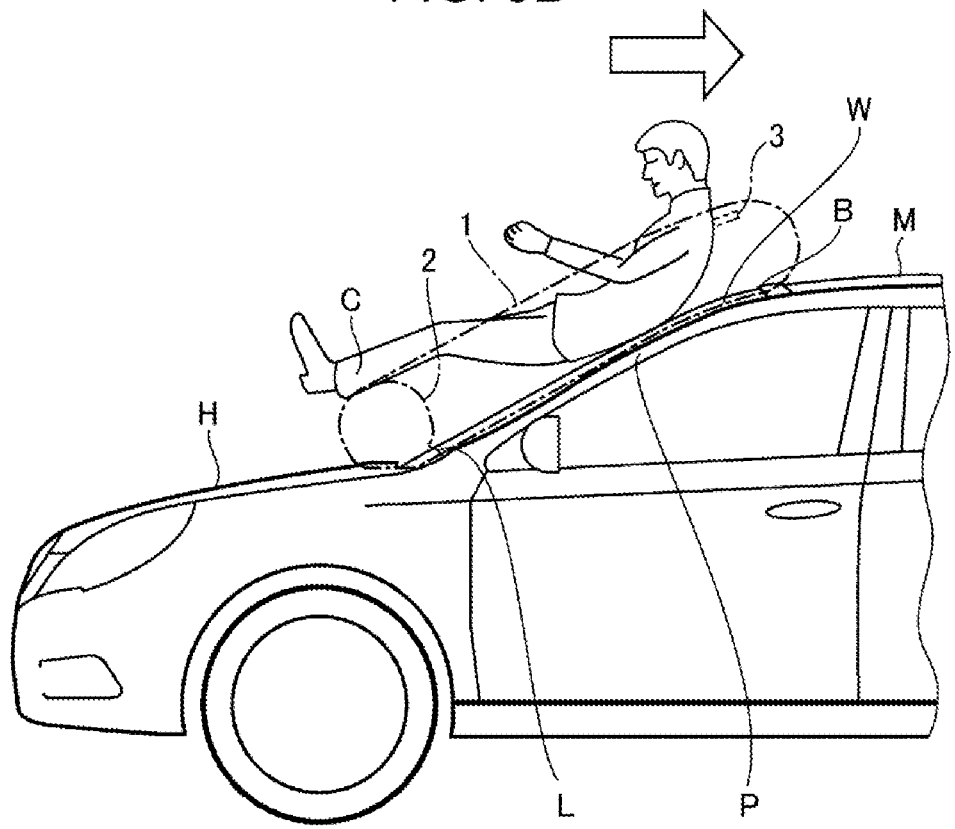

As illustrated in FIG. 5B, in the case where the subject to be protected C is thrown toward the front edge B of the roof panel, the subject to be protected C is received by the posture holding member 3. At this point, according to the pressure from the subject to be protected C thrown rearwardly, the inner side of the posture holding member 3 is deformed so as to be bent inwardly and the lateral edge bags 1 are deformed such that their upper ends come closer to each other. This allows the collision energy of the subject to be protected C to be absorbed smoothly and may reduce the risk of the subject to be protected C being thrown over the posture holding member 3 far rearwardly of the roof panel. In addition, disposition of the posture holding member 3 so as to hide the front edge portion B of the roof panel from the front side allows, for instance, the head of the subject C to be received by the widthwise long surface of the posture holding member 3, thereby protecting the subject C from directly colliding with the front edge portion B of the roof panel.

It is to be noted that the lateral edge bags 1 are preferably deployed so as to project forwardly from the windshield W with thickness T that allows the subject C to get caught inside the lateral edge bags 1. In addition, the posture holding member 3 is preferably provided upwardly in the direction of the thickness T of the lateral edge bags 1a and 1b. This reliably reduces the risk of the subject to be protected C being thrown over the lateral edge bags 1 and the posture holding member 3 to the outside of the external airbag.

In this manner, it is possible to protect the subject C from direct collision with the front pillars P or the front edge portion B of the roof panel and simultaneously to protect the subject C from being thrown to the outside of the lateral edge bags 1 and the posture holding member 3 to be involved in a secondary collision with an oncoming vehicle. In the case where the subject to be protected C is thrown toward the cowl panel L, the subject C is received by the lower edge bag 2, thereby enabling the subject C to be protected from direct collision with the cowl panel L.

According to the present implementation, coupling the upper end portions of the lateral edge bags 1 by the posture holding member 3 allows the posture of the external airbag to be easily stabilized at the time of deployment and after the deployment. In addition, the lateral edge bags 1, the lower edge bag 2, and the posture holding member 3 allow the subject C to be protected from direct collision with solid parts of the automobile M and simultaneously allow the subject C, which is thrown in various directions, to be kept inside the external airbag.

<A Second Implementation>

Figure 6:
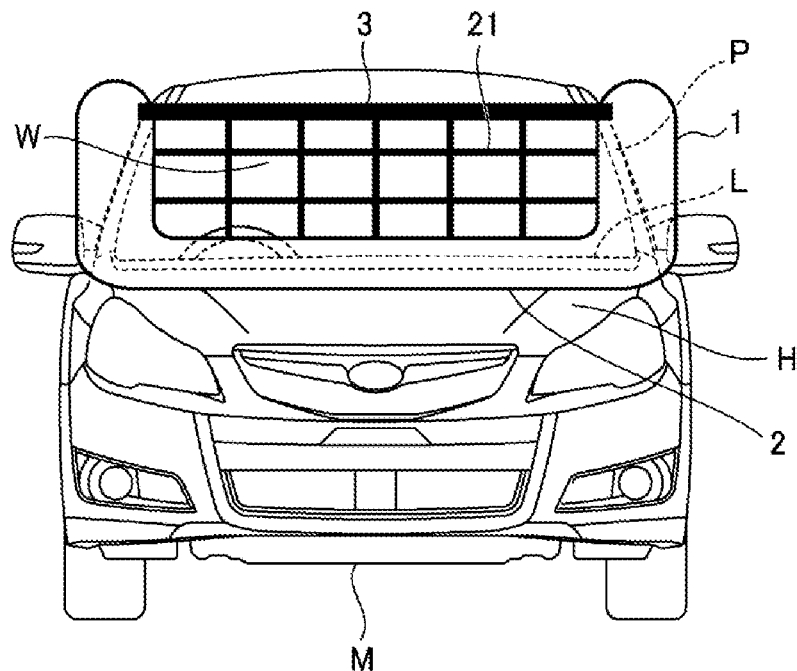
FIG. 6 is a front view illustrating the configuration of an external airbag according to a second implementation of the present disclosure.

The external airbag in the first implementation may be provided with linear members that extend between the lateral edge bags 1. For instance, as illustrated in FIG. 6, linear members 21 extending between the lateral edge bags 1 in a net pattern may be disposed. The linear members 21 include a plurality of horizontal linear members that extends widthwise of the windshield W to couple the inner walls of the lateral edge bags 1 to each other, and a plurality of vertical linear members that extends vertically along the windshield W to couple the linear member disposed uppermost and the inner wall of the lower edge bag 2. Here, the plurality of horizontal linear members are coupled to the vicinities of central portions of the inner walls, in the direction of the thickness T, of the lateral edge bags 1, and the plurality of vertical linear members are coupled to the vicinities of central portions of the inner walls, in the direction of a thickness T, of the lower edge bag 2.

Thus, the subject C thrown toward the windshield W may be received by the linear members 21. At this point, the collision energy of the subject C may be absorbed by the linear members 21 which bend in the space between the linear members 21 and the windshield W, thereby enabling the subject C to be protected from direct collision with the windshield W. It is to be noted that the subject C thrown in a lateral direction of the automobile M may be received by the upper half of the inner walls of the lateral edge bags 1, and the subject C thrown in an upward direction of the automobile M may be received by the posture holding member 3. Also, since the lateral edge bags 1 are mutually coupled by the linear member 21, the posture of the external airbag may be more stabilized at the time of deployment and after the deployment. In addition, disposition of the linear members 21 in a net pattern allows the view of the driver to be secured.

Figure 7:
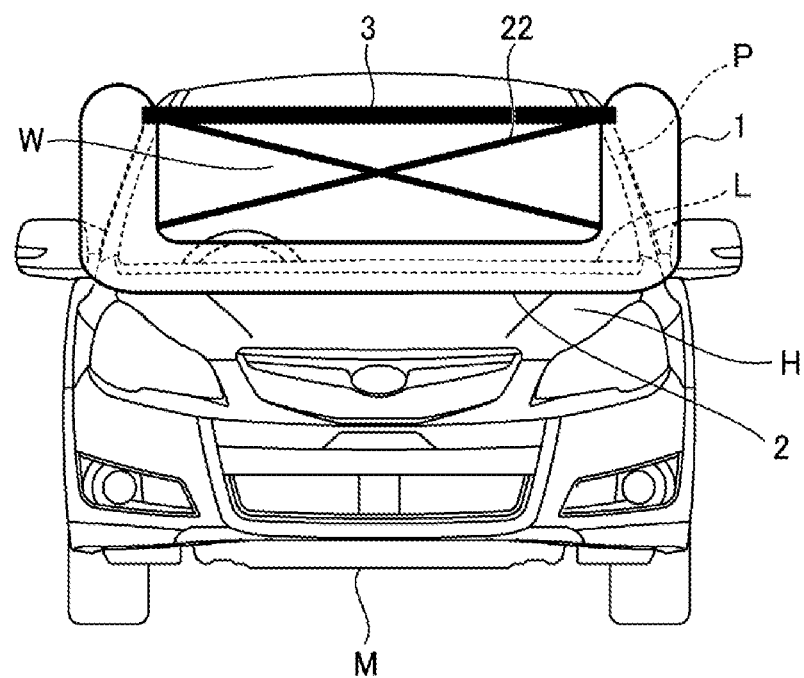
FIG. 7 is a front view illustrating the configuration of an external airbag according to a modification of the second implementation of the present disclosure.

As illustrated in FIG. 7, the linear members 22 may also be disposed so as to extend from the upper end of one lateral edge bag 1 to the lower end of the other lateral edge bag 1 and to extend from the upper end of the other lateral edge bag 1 to the lower end of the one lateral edge bag 1. This enables the subject C to be protected from direct collision with the windshield W, and the subject C thrown in an upward or a lateral direction of the automobile M may be received by the posture holding member 3 or the lateral edge bags 1. In addition, the posture of the external airbag at the time of deployment and after the deployment may be stabilized and the view of the driver may be secured. It is to be noted that the linear members may be composed of, for instance, a tether, the ground fabric of the external airbag, or a thin airbag.

<A Third Implementation>

Although the lateral edge bags 1 and the lower edge bag 2 are formed to have a continuous circular cross section in the first and second implementations, it is sufficient to be able to receive the subject to be protected C, and the cross section is not limited to be circular.

Figure 8A:
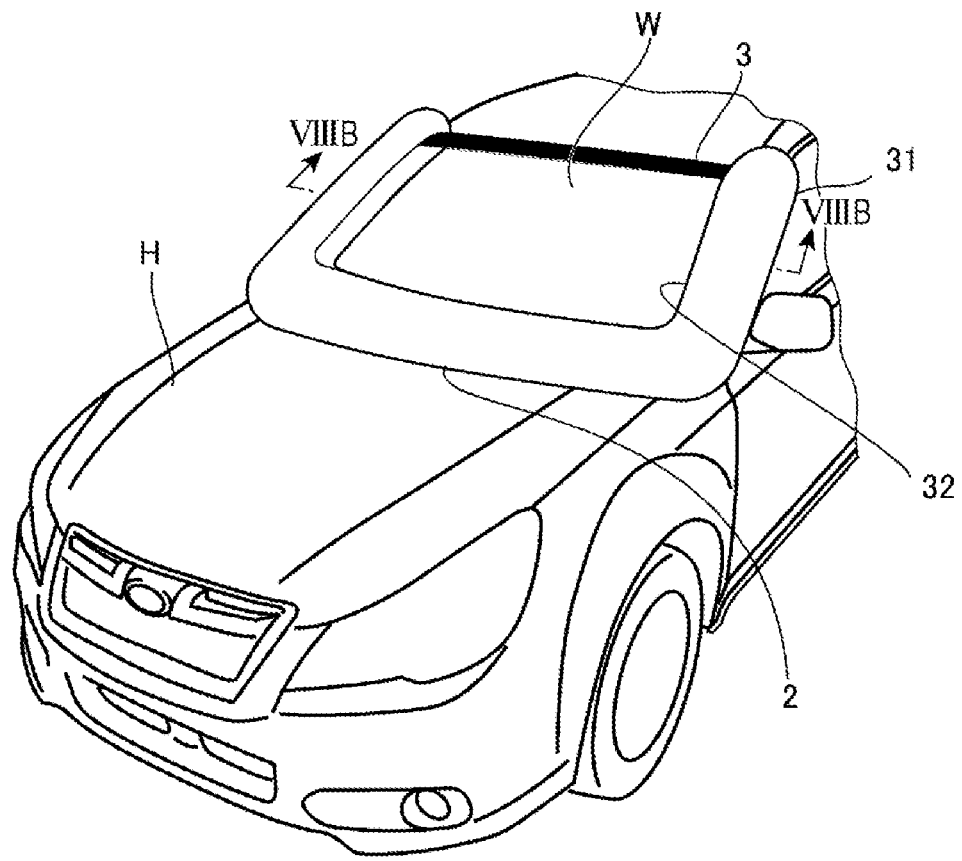
FIGS. 8A and 8B illustrate the configuration of an external airbag according to a third implementation of the present disclosure.
Figure 8B:
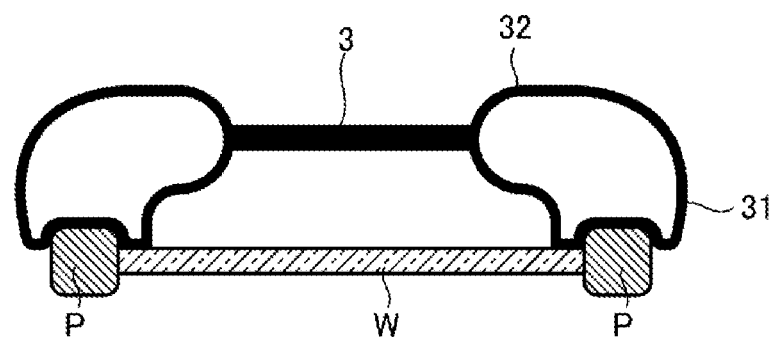

For instance, as illustrated in FIGS. 8A and 8B, instead of the lateral edge bags 1 in the first implementation, lateral edge bags 31 in a pair may be disposed. The lateral edge bags 31 are formed so that end 32 thereof in the direction forwardly projecting from the windshield W is bent inwardly. Consequently, when the subject C thrown toward a front pillar P is received by a lateral edge bag 21, it is possible to reliably support the subject C thrown from the inner side to the outer side and to reduce the risk of the subject C being thrown over the lateral edge bags 31 to the outside.

According to the present implementation, the end 32 of the lateral edge bags 31 is formed to be bent inwardly, and thus it is possible to reliably support the outwardly thrown subject C and to keep the subject C inside the external airbag.

<A Fourth Implementation>

Although the lateral edge bags in the pair and the lower edge bag are formed with an uniform thickness T in the first to third implementations, the thickness T may be changed according to the location of disposition.

Figure 9:
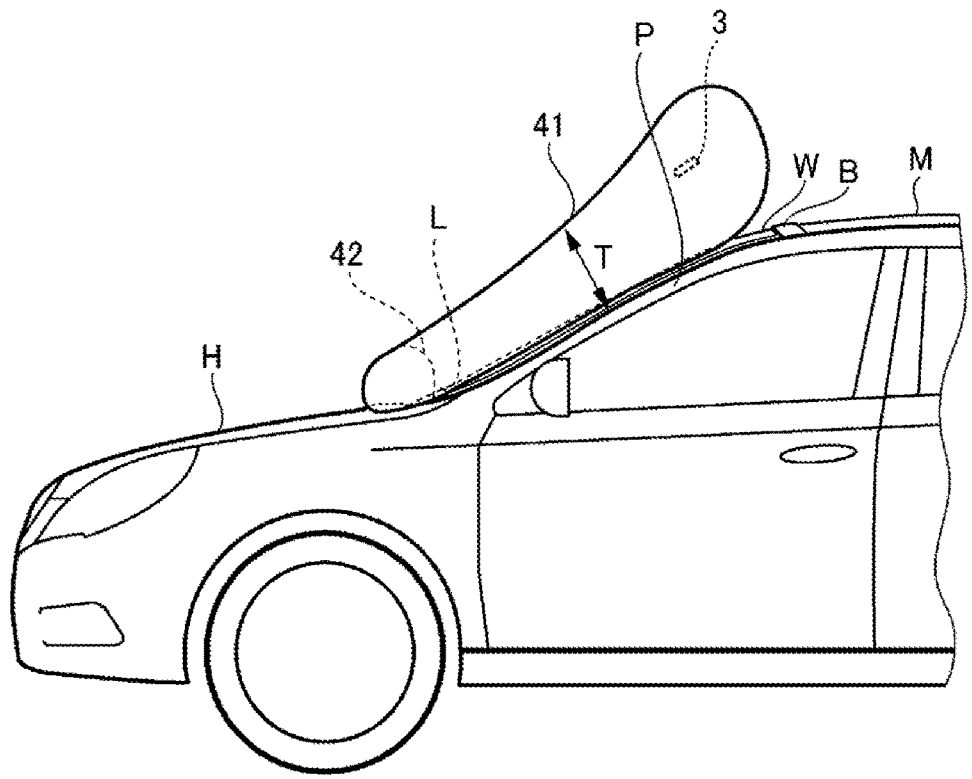
FIG. 9 is a side view illustrating the configuration of an external airbag according to a fourth implementation of the present disclosure.

For instance, as illustrated in FIG. 9, instead of the lateral edge bags 1 and the lower edge bag 2, lateral edge bags 41 in a pair and a lower edge bag 42 may be disposed. The lateral edge bags 41 is formed so that a thickness T forwardly protruding from the windshield W gradually increases from the lower end to the upper end. Also, the thickness T of the lower edge bag 42 is formed with the same thickness as the thickness T of the lower end of each lateral edge bag 41. That is, the external airbag is formed so that the thickness T forwardly protruding from the windshield W gradually increases from the lower edge to the upper edge of the windshield W. It is to be noted that the posture holding member 3 is provided so as to mutually couple the vicinities of central portions, in the thickness direction T, of the lateral edge bags 41 at the upper ends of the lateral edge bags 41.

According to the present implementation, reduced thickness T in part allows the speed of deployment to be improved and a housing space to be decreased, and increased thickness T of the upper end of each lateral edge bag 41 allows a function of receiving the subject C to be maintained. It is to be noted that the thickness T of the external airbag is preferably changed according to the direction in which the subject to be protected C is thrown. For instance, when it is probable that the subject to be protected C is thrown toward the lower edge of the windshield W, the external airbag may be formed so that the thickness T gradually increases from the upper edge side to the lower edge side of the windshield W.

Figure 10:
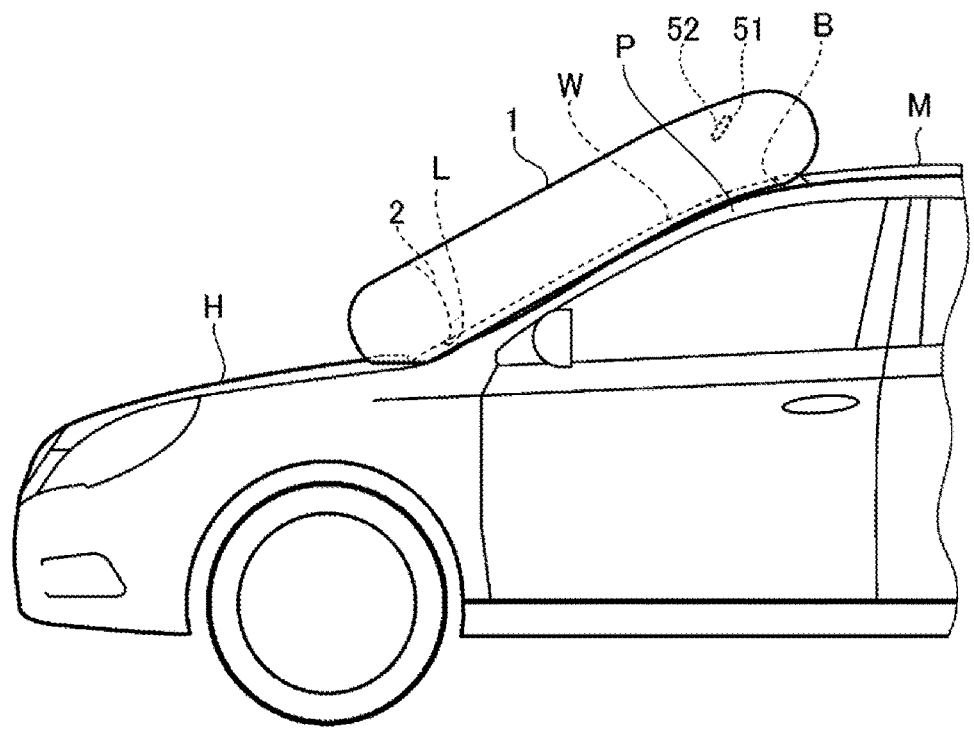
FIG. 10 is a side view illustrating the configuration of an external airbag according to a modification of the first to fourth implementations of the present disclosure.

It is to be noted that in the first to fourth implementations, the posture holding member 3 is disposed with the widthwise long surface thereof substantially parallel to the windshield W. However, it is sufficient that the upper end portions of the lateral edge bags in the pair be coupled, and the shape and orientation of the posture holding member 3 are not particularly limited. For instance, as illustrated in FIG. 10, instead of the posture holding member 3 in the first implementation, a posture holding member 51 may be disposed. The posture holding member 51 is disposed to be inclined to the windshield W so that a widthwise long surface 52, which is formed to be long widthwise, faces the front side. Consequently, the widthwise long surface 52 of the posture holding member 51 may be disposed in a direction in which the subject to be protected C is thrown, and thus the head of the subject C thrown toward the front edge portion B of the roof panel may be received by the front of the widthwise long surface 52.

The invention claimed is:

1. An external airbag comprising:
   lateral edge bags in a pair that are deployed to extend upward along respective front pillars from lower ends of the respective front pillars, in front of the respective front pillars, the respective front pillars being disposed on both widthwise sides of a windshield of an automobile; and
   a posture holding member that couples upper ends of the lateral edge bags in the pair to each other,
   wherein the posture holding member is disposed to hide a front edge of a roof panel from a front side, the front edge being provided along an upper edge of the windshield.

2. The external airbag according to claim 1, further comprising a linear member that extends between the lateral edge bags in the pair.

3. The external airbag according to claim 2, wherein the linear member is disposed in a net pattern between the lateral edge bags in the pair.

4. The external airbag according to claim 1, further comprising a lower edge bag that is deployed along a cowl panel that is disposed at a lower edge portion of the windshield.

5. The external airbag according to claim 2, further comprising a lower edge bag that is deployed along a cowl panel that is disposed at a lower edge portion of the windshield.

6. An external airbag comprising:
   lateral edge bags in a pair that are deployed to extend upward along respective front pillars from lower ends of the respective front pillars, in front of the respective front pillars, the respective front pillars being disposed on both widthwise sides of a windshield of an automobile; and
   a posture holding member that couples upper ends of the lateral edge bags in the pair to each other,
   wherein the lateral edge bags in the pair are deployed to cover the respective front pillars from lower ends to upper ends, and
   wherein the posture holding member is disposed to hide a front edge of a roof panel from a front side, the front edge being provided along an upper edge of the windshield.

7. The external airbag according to claim 6, further comprising a linear member that extends between the lateral edge bags in the pair.

8. The external airbag according to claim 7, wherein the linear member is disposed in a net pattern between the lateral edge bags in the pair.

9. The external airbag according to claim 6, further comprising a lower edge bag that is deployed along a cowl panel that is disposed at a lower edge portion of the windshield.

10. The external airbag according to claim 7, further comprising a lower edge bag that is deployed along a cowl panel that is disposed at a lower edge portion of the windshield.

11. An external airbag comprising:
   lateral edge bags in a pair that are deployed to extend upward along respective front pillars from lower ends of the respective front pillars, in front of the respective front pillars, the respective front pillars being disposed on both widthwise sides of a windshield of an automobile;
   a posture holding member that couples upper ends of the lateral edge bags in the pair to each other; and
   a linear member that extends between the lateral edge bags in the pair.

12. The external airbag according to claim 11, wherein the linear member is disposed in a net pattern between the lateral edge bags in the pair.

13. The external airbag according to claim 11, further comprising a lower edge bag that is deployed along a cowl panel that is disposed at a lower edge portion of the windshield.

* * * * *